(12) United States Patent
Venticinque et al.

(10) Patent No.: US 9,465,515 B2
(45) Date of Patent: Oct. 11, 2016

(54) GRAPHICAL USER INTERFACE FOR MOBILE PRESENTATION APPLICATION

(71) Applicant: LinkedIn Corporation, Mountain View, CA (US)

(72) Inventors: Jess D. Venticinque, San Francisco, CA (US); Andri H. Kristinsson, San Francisco, CA (US); Nathan U. Barraille, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 59 days.

(21) Appl. No.: 14/231,130

(22) Filed: Mar. 31, 2014

(65) Prior Publication Data
US 2015/0277674 A1  Oct. 1, 2015

(51) Int. Cl.
*G06F 3/00* (2006.01)
*G06F 3/0481* (2013.01)
*G06F 3/0488* (2013.01)
*G06F 3/0485* (2013.01)

(52) U.S. Cl.
CPC ......... *G06F 3/04817* (2013.01); *G06F 3/0485* (2013.01); *G06F 3/0488* (2013.01)

(58) Field of Classification Search
CPC .................... G06F 3/0482; G06F 3/04817
USPC ........................... 715/838, 730, 733
See application file for complete search history.

(56) References Cited

U.S. PATENT DOCUMENTS

| 8,392,360 B1* | 3/2013 | Dicker et al. ................. 707/608 |
| 2003/0227478 A1* | 12/2003 | Chatfield ...................... 345/751 |
| 2008/0040673 A1* | 2/2008 | Zuckerberg ....... G06F 17/30867 715/745 |
| 2010/0037140 A1* | 2/2010 | Penner et al. ................ 715/732 |

* cited by examiner

*Primary Examiner* — Andrey Belousov
(74) *Attorney, Agent, or Firm* — Park, Vaughan, Fleming & Dowler LLP

(57) ABSTRACT

During a user-interface technique, a user interface that includes information associated with a set of presentations is displayed on an electronic device. In this user interface, the presentations are arranged in different categories along a vertical direction of the user interface in an order that is determined based on presentation preferences of a user of the electronic device and/or presentation activities of a group of individuals associated with the user. Furthermore, thumbnails or tiles associated with pages of individual presentations in the set of presentations are arranged along a horizontal direction of the user interface. Subsequently, in response to the user input, the displayed user interface is modified. For example, if the user input specifies a vertical displacement, the set of presentations is displaced along the vertical direction. Alternatively, if the user input specifies a horizontal displacement, the thumbnails for a given presentation are displaced along the horizontal direction.

20 Claims, 9 Drawing Sheets

GRAPHICAL USER INTERFACE FOR MOBILE PRESENTATION APPLICATION

BACKGROUND

1. Field

The described embodiments relate to techniques for providing information associated with presentations. More specifically, the described embodiments relate to a user interface that displays information associated with the presentations.

2. Related Art

The increasing popularity and capabilities of electronic devices are resulting in a significant increase in the creation and dissemination of content. Some of this content (which is sometimes referred to as 'knowledge') remains interesting to users of the electronic devices and is valid for a long time. However, given the large and growing amount of content being created and disseminated, it can be difficult for users to identify knowledge that is useful or relevant.

For example, presentations are a popular format for providing personal and professional content. In particular, individuals often use presentations to supplement their résumés during job searches. Similarly, companies often use presentations to highlight their capabilities and to illustrate successful projects. However, the capabilities that allow users to create and disseminate presentations are overwhelming the abilities of the users to sort through the resulting large number of presentations to find those of interest, which can degrade the user experience.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for displaying information associated with a set of presentations, a user interface (such as a graphical user interface) that includes the information and a computer-program product (e.g., software) for use with the electronic device are described. During this user-interface technique, a user interface that includes the information associated with the set of presentations is displayed on the electronic device. In the user interface, the presentations are arranged in different categories along a vertical direction of the user interface in an order that is determined based on presentation preferences of a user of the electronic device and/or presentation activities of a group of individuals associated with the user. Furthermore, thumbnails or tiles associated with pages or slides of individual presentations in the set of presentations is arranged along a horizontal direction of the user interface. Subsequently, in response to the user input, the displayed user interface is modified. For example, if the user input specifies a vertical displacement, the set of presentations is displaced along the vertical direction. Alternatively, if the user input specifies a horizontal displacement, the thumbnails for a given presentation are displaced along the horizontal direction.

By displaying the set of presentations that is likely to be the most relevant to the user in a user interface that readily facilitates user interaction and viewing of the presentations, the user-interface technique may allow the user to find and share interesting content, even when there is a large number of presentations and/or new presentations are routinely being posted by other individuals. This may significantly enhance the user experience, thereby increasing customer satisfaction with a provider of the user-interface technique and facilitating dissemination of presentations among the group of individuals.

In the discussion that follows, an individual, a user or a recipient of content (such as the information and/or one or more presentations in the set of presentations) may include a person (for example, an existing customer, a new customer, a student, an employer, an employee, a prospective employee, a supplier, a service provider, a vendor, a contractor, etc.). More generally, the user-interface technique may be used by an individual, an organization, a business and/or a government agency. Furthermore, a 'business' should be understood to include for-profit corporations, non-profit corporations, groups (or cohorts) of individuals, sole proprietorships, government agencies, partnerships, etc.

Figure 1:
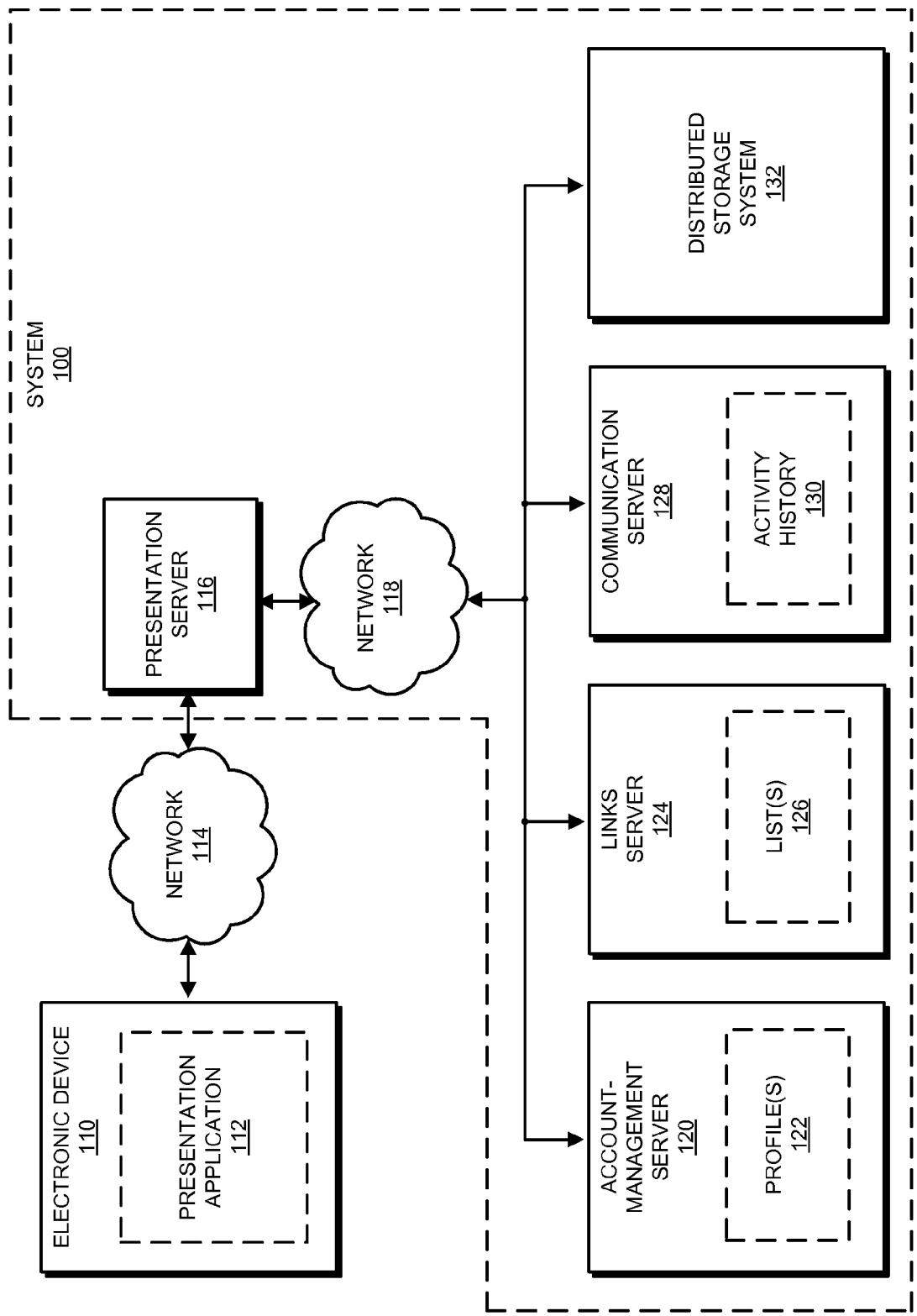
FIG. 1 is a block diagram illustrating a system that displays information associated with a set of presentations in accordance with an embodiment of the present disclosure.

We now describe embodiments of the system. FIG. 1 presents a block diagram illustrating a system 100 that provides content, such as the set of presentations. (In the discussion that follows, a given presentation includes a sequence of discrete pages that include content, such as text, graphics and/or images, and has a fixed length.) In this system, presentation server 116 communicates information (such as a set of presentations) with an electronic device 110 (such as a cellular telephone) via a network 114 (such as a cellular-telephone network, a Wi-Fi® network and/or the Internet). As described further below with reference to FIGS. 4-8, a presentation application 112, which is executed in an environment of electronic device 110, may generate a user interface that is displayed on electronic device 110. This user interface may include information associated with the set of presentations. Moreover, the user interface may provide a dynamic arrangement of the set of presentations, so that a user of electronic device 110 may intuitively navigate through and view presentations that are of interest.

In particular, when the user logs in (i.e., provides account credentials, such as a username and password) to a presentation user account from electronic device 110 or specifies a refresh operation (e.g., by activating an icon in the user interface or performing a refresh gesture on a touch-sensitive display), presentation server 116 may assemble and provide, via network 114, an update (such as a differential update) to the set of presentations that are stored in memory in electronic device 110. Note that the update may include a timestamp (or another identifier) that allows this update to be distinguished from previous or subsequent updates to the set of presentations. In an exemplary embodiment, the memory stores up to 90 presentations, which are overwritten, as needed, during updates.

In some embodiments, instead of providing the set of presentations, presentation server 116 provides summary information and metadata associated with the set of presentations (such as thumbnails or tiles associated with the pages in the set of presentations), which are stored in the memory. Subsequently, if the user activates an icon in the user interface that is associated with a particular presentation, presentation server 116 may provide the requested presentation to electronic device 110. Note that by storing the set of presentations (or information, such as the summaries and metadata, that are associated with or specify the set of presentations) locally on electronic device 110, presentation application 112 may allow the user to interact with, view and/or modify the set of presentations, even when communication via network 114 is unavailable or when the user has not logged in to their user account with presentation server 116.

When assembling the update for electronic device 110, presentation server 116 may interact or communicate with several other servers, as well as a distributed storage system. In particular, the set of presentations and the order of the set of presentations in a given update may be dynamically determined by presentation server 116 based on presentation settings of the user, presentation preferences of the user and/or presentation activities of a group of individuals associated with the user.

For example, the presentation preferences may include categories of presentations or content that are followed by the user or to which the user subscribes. These presentation preferences may be included in one of profiles 122 of a user account for the user that is maintained by account-management server 120. (More generally, a given one of profiles 122 may include personal and/or business information of the user, such as a work history, an education history, a list of skills or attributes of the user, etc.) Thus, the presentation preferences may be provided by account-management server 120 to presentation server 116 via network 118 (such as an intranet and/or the Internet). In addition, presentation preferences or settings of the user (such as the number of presentations to include in the update) may be provided by account-management server 120 to presentation server 116 via network 118.

Moreover, the group of users may include: individuals with whom the user has a professional or business relationship (such as current or former colleagues or co-workers), friends of the user, friends of friends of the user, individuals in a social network or professional network that includes the user, individuals at organizations, individuals at companies, individuals at educational institutions, individuals at entities, and/or individuals with whom the user has a connection in a social network. In particular, links server 124 may maintain one or more lists 126 of people whose activities the user follows (as evidenced by likes, shares, uploads, views, comments, etc.) and/or that follow the activities of the user; links server 124 may provide this information to presentation server 116 via network 118.

More generally, lists 126 may include 'connections' or interrelationships among user and other individuals and/or groups. In addition, the presentation user account may be coupled with or linked to other accounts of the user, such as a social network hosted or supported by the provider of the user-interface technique and/or a social network provided by a different organization. Binding of the user's accounts may be specified in the presentation preferences of the user, and may be transmitted by account-management server 120 to presentation server 116 via network 118. As described below, based on this information presentation server 116 may monitor activity on the other accounts (such as online posting) via communication server 128.

Furthermore, communication server 128 may maintain an activity history 130 of the user's activities (in the presentation user account and/or another user account), as well as the activities of one or more groups of individuals associated with the user (such as people the user follows). These activities may include: sharing of a presentation, someone indicating that they like a particular presentation, someone viewing a particular presentation, someone commenting on a particular presentation, and/or overall trends in the popularity of presentations among the individuals in a group of individuals (such as trends during a time interval, such as the last 24 hours, week, etc.). Communication server 128 may provide this information to presentation server 116 via network 118.

Using the information received from account-management server 120, links server 124 and/or communication server 128, presentation server 116 may determine the set of presentations and their order in the update. Then, presentation server 116 may access the set of presentations and/or the information associated with the set of presentations stored in distributed storage system 132 via network 118. Once the update is assembled, presentation server 116 may provide the update to electronic device 110.

In an exemplary embodiment, the set of presentations include shared presentations (which may be presentations available at a URL corresponding to www.slideshare.net). These shared presentations may be associated with recruiting by an organization or a job search by an individual or, more generally, commercials, news, previous work of an individual, insightful content, interviews, trends in marketing, designs, how-to demonstrations, etc.

Additionally, in an exemplary embodiment presentation server 116 determines the set of presentations and their order in a given update using an ordering technique associated with the user-interface technique. In particular, the sequential order of the categories and the presentations in the given update may be determined based on: updates from the group of individuals (such as likes for presentations provided by one or more individuals in the group, uploaded presentations provided by one or more individuals in the group, etc.), aggregated top lists (such as most-liked presentations, most-viewed presentations, etc.), aggregated social-share lists (such as presentation trends on a different social network), presentations featured in a category the user subscribes to or follows (such as presentation of the day, business presentations, education presentations, presentations in other categories, etc.), and/or expanded network updates (presentations downloaded by people you know, presentation views from people you know, presentations uploaded by friends of friends, etc.).

In this way, system 100 may be used to provide updates with the set of presentations and/or the information associated with the set of presentations to electronic device 110.

As described further below with reference to FIG. 3, in some embodiments the user-interface technique is implemented using a client-server architecture. In some embodiments, functions of presentation application 112 are included in a web page that is provided via network 114, and which is rendered by a browser on electronic device 110. For example, at least some of the operations in the user-interface technique are performed by an application tool that is embedded in the web page, and which executes in a virtual environment of the browser. Alternatively, in other embodiments at least some of the operations in the user-interface technique are performed by a software product or application that is resident on and that executes on electronic device 110. The application operated by the user may be a standalone application or a portion of another application that is resident on and which executes on electronic device 110 (such as an application that is provided by presentation server 116 or that is installed and which executes on electronic device 110).

Note that information in system 100 may be stored at one or more locations in system 100 (i.e., locally and/or remotely). Moreover, because this data may be sensitive in nature, it may be encrypted. For example, stored data and/or data communicated via network 114 and/or network 118 may be encrypted.

Figure 2:
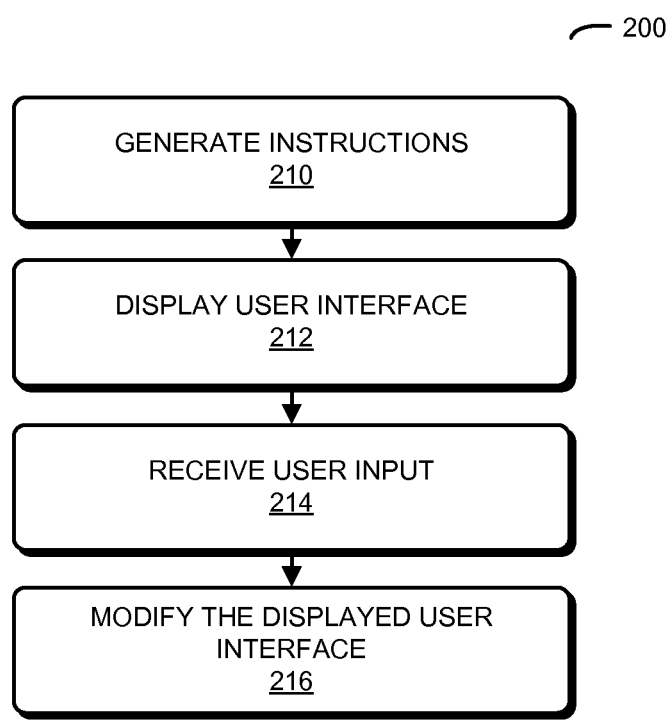
FIG. 2 is a flow chart illustrating a method for displaying the information associated with the set of presentations in accordance with an embodiment of the present disclosure.

FIG. 2 presents a flow chart illustrating a method 200 for displaying information associated with a set of presentations, which may be performed by an electronic device (such as electronic device 110 in FIG. 1). During operation, the electronic device generates instructions (operation 210) for the user interface that include the information associated with the set of presentations, which is arranged in the user interface in different categories along the vertical direction of the user interface. Note that the order of the different categories in the vertical direction may be determined based on presentation preferences of the user of the electronic device and presentation activities of the group of individuals associated with the user, and thumbnails associated with pages in the set of presentations is arranged along the horizontal direction of the user interface.

Then, the electronic device displays the user interface on the display (operation 212) in the electronic device.

Subsequently, the electronic device receives user input (operation 214). In response to the user input, the electronic device modifies the displayed user interface (operation 216). For example, if the user input specifies a vertical displacement (e.g., by dragging a finger or other tool vertically on a touch-screen display component), the modification includes displacing the set of presentations along the vertical direction. Alternatively, if the user input specifies a horizontal displacement (e.g., by dragging a finger or other tool horizontally on a touch-screen display component), the modification includes displacing the thumbnails for the given presentation along the horizontal direction.

In an exemplary embodiment, the user-interface technique is implemented using an electronic device (such as a computer, a cellular telephone and/or a portable electronic device) and two or more servers, which communicate through a network, such as a cellular-telephone network and/or the Internet (e.g., using a client-server architecture). This is illustrated in FIG. 3, which presents a flow chart illustrating method 200 (FIG. 2). During this method, presentation server 116 may provide (operation 310), and electronic device 110 may receive (operation 312), an update with a set of presentations (or information associated with the set of presentations).

In response to receiving (operation 312) the update, electronic device 110 generates instructions (operation 314) and displays the user interface (operation 316). Subsequently, when a user input is received (operation 318), electronic device 110 modifies the displayed user interface (operation 320). For example, if a user input specifies a vertical displacement, the set of presentations may be displaced along the vertical direction. Alternatively, if a user input specifies a horizontal displacement, the thumbnails for a given presentation may be displaced along the horizontal direction.

Figure 3:
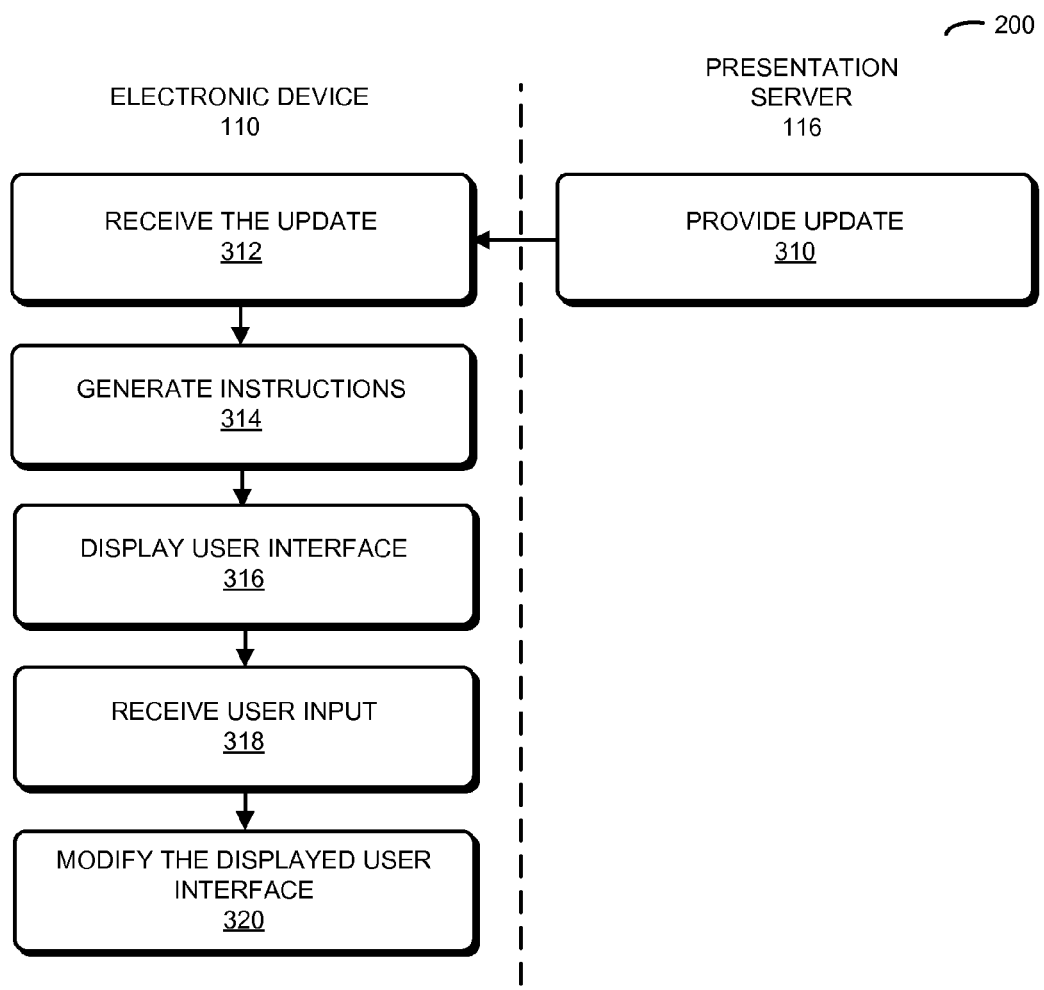
FIG. 3 is a flow chart further illustrating the method of FIG. 2 in accordance with an embodiment of the present disclosure.

In some embodiments of method 200 (e.g., as depicted in FIGS. 2 and 3), there may be additional or fewer operations. Moreover, the order of the operations may be changed, and/or two or more operations may be combined into a single operation.

Figure 4:
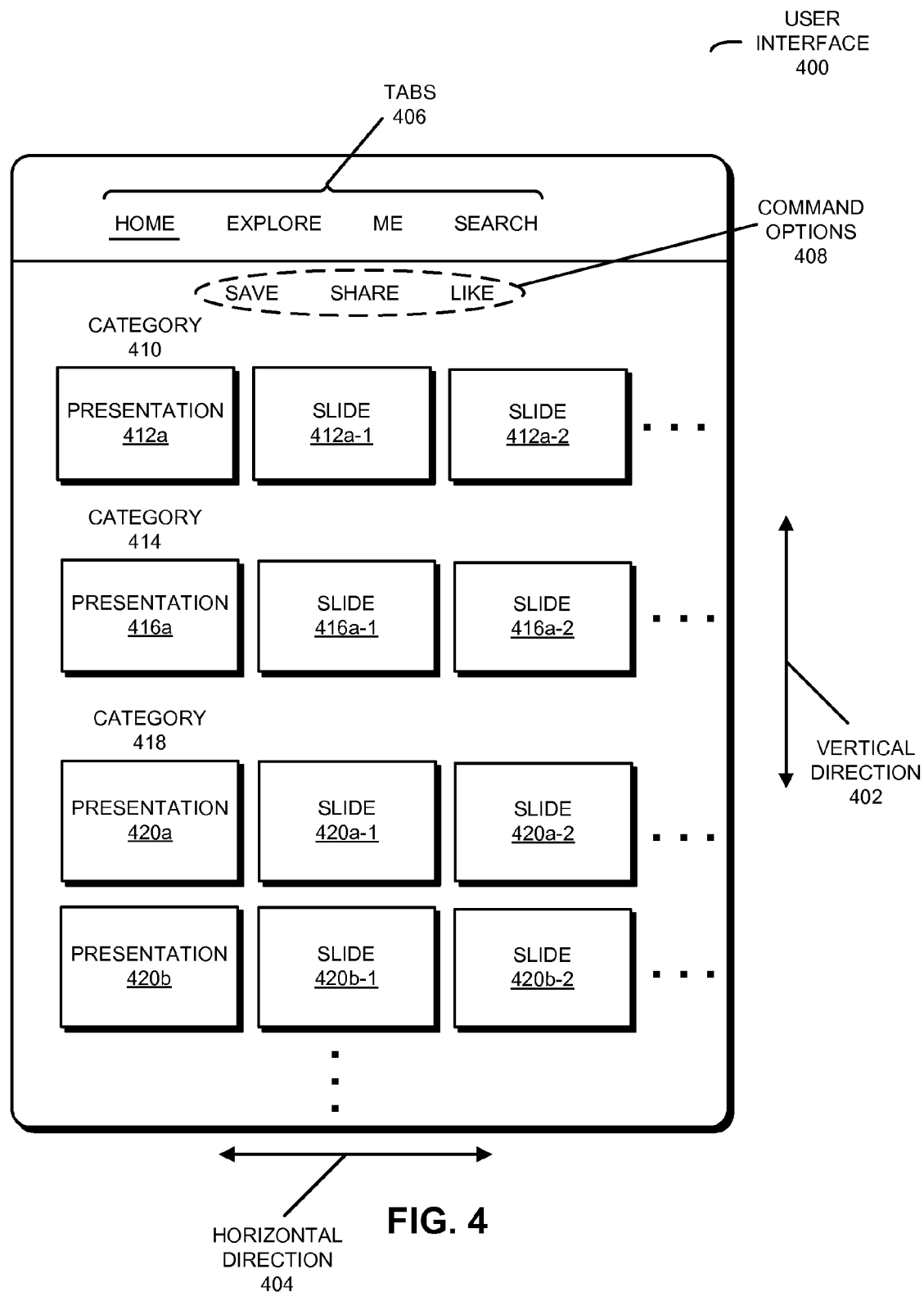
FIG. 4 is a block diagram illustrating a user interface that displays the information associated with the set of presentations in accordance with an embodiment of the present disclosure.

We now describe embodiments of the user interface and the user-interface technique. FIG. 4 presents a block diagram illustrating a user interface 400 that displays the information associated with the set of presentations. In particular, user interface 400 allows the user to view the slides in a given presentation along a horizontal direction 404 of user interface 400, and to scroll among multiple presentations in each of multiple categories (such as technology, business, education, news and politics, design, marketing, entertainment and humor, economy and finance, editor's picks, etc.) along a vertical direction 402 of user interface 400.

For example, if the display in the electronic device is a touch-sensitive display, the user may swipe at least one finger against the display surface along vertical direction 402 to scroll among presentations in each of categories 410 (e.g., presentation 412a), 414 (e.g. presentation 416a), 418 (e.g., presentations 420a, 420b). Alternatively, by swiping at least one finger along horizontal direction 404, the user may view or explore the slides in the given presentation, such as slides 416a-1, 416a-2, and so on in presentation 416a.

Note that presentations offered in user interface 400 may include a set of presentations received in an update from presentation server 116 (FIG. 1). Moreover, the presentations may constitute a dynamic and personalized feed of presentations for the user, and the order of categories 410, 414, 418 (and, thus, the presentations in each category) in user interface 400 may be dynamically determined using the ordering technique described previously (e.g., based on the presentation preferences of the user and/or the presentation activities of the group of individuals associated with the user). Thus, the user-interface technique may filter presentation events for the user, and may present those presentations that are likely to be relevant and/or of interest to the user, possibly in order of their perceived relevance. While user interface 400 is illustrated as including categories 410, 414 that include only one presentation (presentations 412a, 416a), in other embodiments any or all categories include more than one presentation.

User interface 400 may include several selectable tabs 406, such as a 'home' tab, an 'explore' tab, a 'me' tab, and a 'search' tab. The home tab is illustrated in FIG. 4, while the 'explore' tab, the 'me' tab, and the 'search' tab are, respectively, illustrated in FIGS. 6-8.

When viewing a given presentation in user interface 400, a set of icons may be displayed to provide the user with command options 408. In particular, there may be a 'save' icon (which allows the user to save or store a copy of the given presentation in local memory on the electronic device), a 'share' icon (which allows the user to share the given presentation with one or more other individuals), and/or a 'like' icon (which allows the user to indicate that they liked the given presentation). For example, activating the save icon (such as by touching the save icon or in a region proximate to the save icon on a touch-sensitive display) may result in the given presentation being saved in memory on the electronic device. This local copy of the given presentation may only be accessible via the electronic device, and it may be available even when the user is offline (i.e., when there is no network access).

Similarly, if the user activates the share icon, a text box may be displayed that allows the user to type in a recipient. Alternatively or additionally, the user may select the recipient using a control object that displays the user's contacts (e.g., in an address book, in a social network, etc.). Once the recipient is specified, information specifying the given presentation may be shared with the designated recipient using a Short Message Service (SMS) message or another communication technique.

Furthermore, if the user activates the like icon, this recommendation may be communicated as a public action to individuals that follow or subscribe to the user's presentation activities. Thus, records of likes may be maintained in system 100 (FIG. 1) and/or an affiliated social network.

If the user selects or activates a presentation offered in user interface 400 (e.g., by tapping on or proximate to an icon for a presentations) or if the user selects or activates one of the slides for this presentation, user interface 400 may be modified to show information for the selected presentation.

Figure 5:
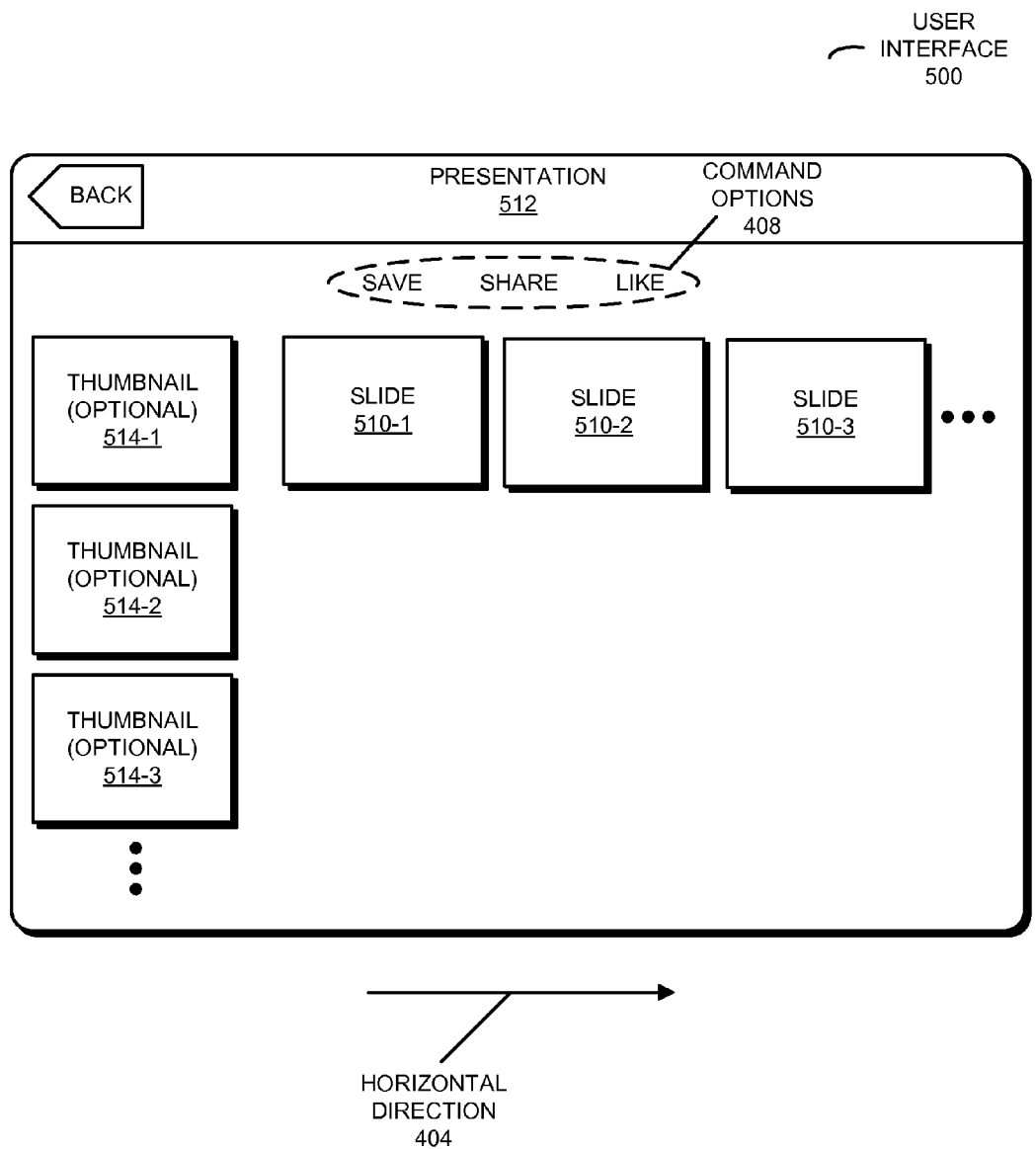
FIG. 5 is a block diagram illustrating a user interface that displays the information associated with the set of presentations in accordance with an embodiment of the present disclosure.

This is shown in FIG. 5, which presents a block diagram illustrating a user interface 500 that displays the information associated with the set of presentations. In particular, user interface 500 may include slides 510 (or thumbnails or tiles representing slides 510) in selected presentation 512. Other information from user interface 400 (FIG. 4) may be excluded. Note that if user interface 500 is viewed in a landscape orientation, optional thumbnails (or tiles) 514 for slides 510 may be shown on the left-hand side for easy accelerated navigation through the selected presentation. Alternatively or additionally, the user can perform a swipe gesture along horizontal direction 404 to scroll through slides 510. The user can also return to user interface 400 (FIG. 4) by activating the back icon.

In contrast with shares or likes (i.e., activation of the share icon or the like icon) in user interface 400 (FIG. 4), views of presentation 512 by the user may be anonymous. In particular, while other individuals in the group of individuals may be alerted that someone in the group viewed presentation 512, the identity of the user (in this example) may be kept anonymous (i.e., this may not be a public action).

Figure 6:
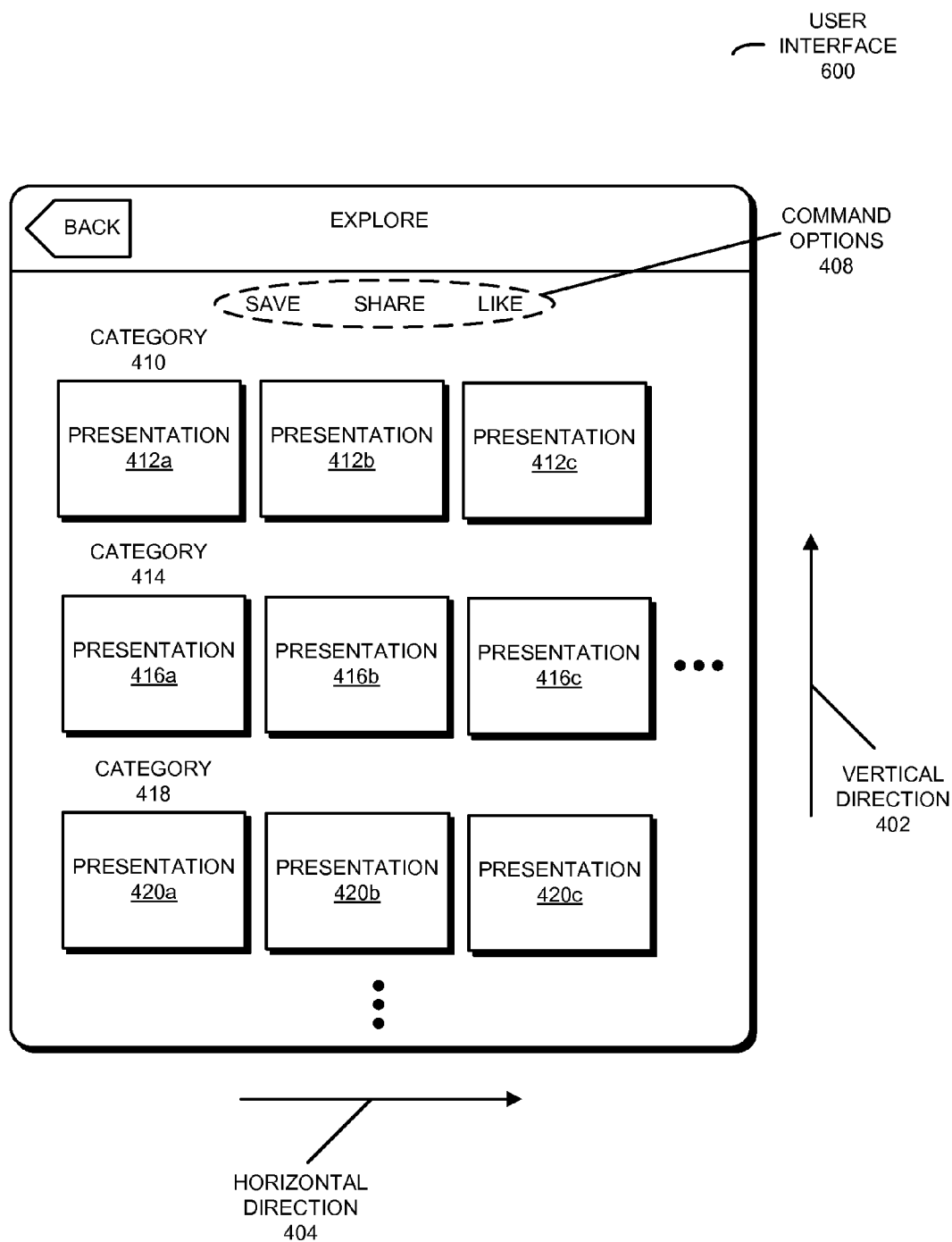
FIG. 6 is a block diagram illustrating a user interface that displays the information associated with the set of presentations in accordance with an embodiment of the present disclosure.

Moreover, if the user activates the explore tab in user interface 400 (FIG. 4), user interface 400 (FIG. 4) may be modified or replaced. This is shown in FIG. 6, which presents a block diagram illustrating a user interface 600 that displays the information associated with the set of presentations. In particular, user interface 600 includes categories 410, 414, 418. These categories are arranged in the same order as the feed in user interface 400 (FIG. 4). In contrast with user interface 400 (FIG. 4), each of these categories now includes multiple presentations. If the user activates one of these presentations (e.g., by tapping on or proximate to an icon for the one of the presentations), user interface 500 (FIG. 5) may be displayed with the information for the selected presentation.

Figure 7:
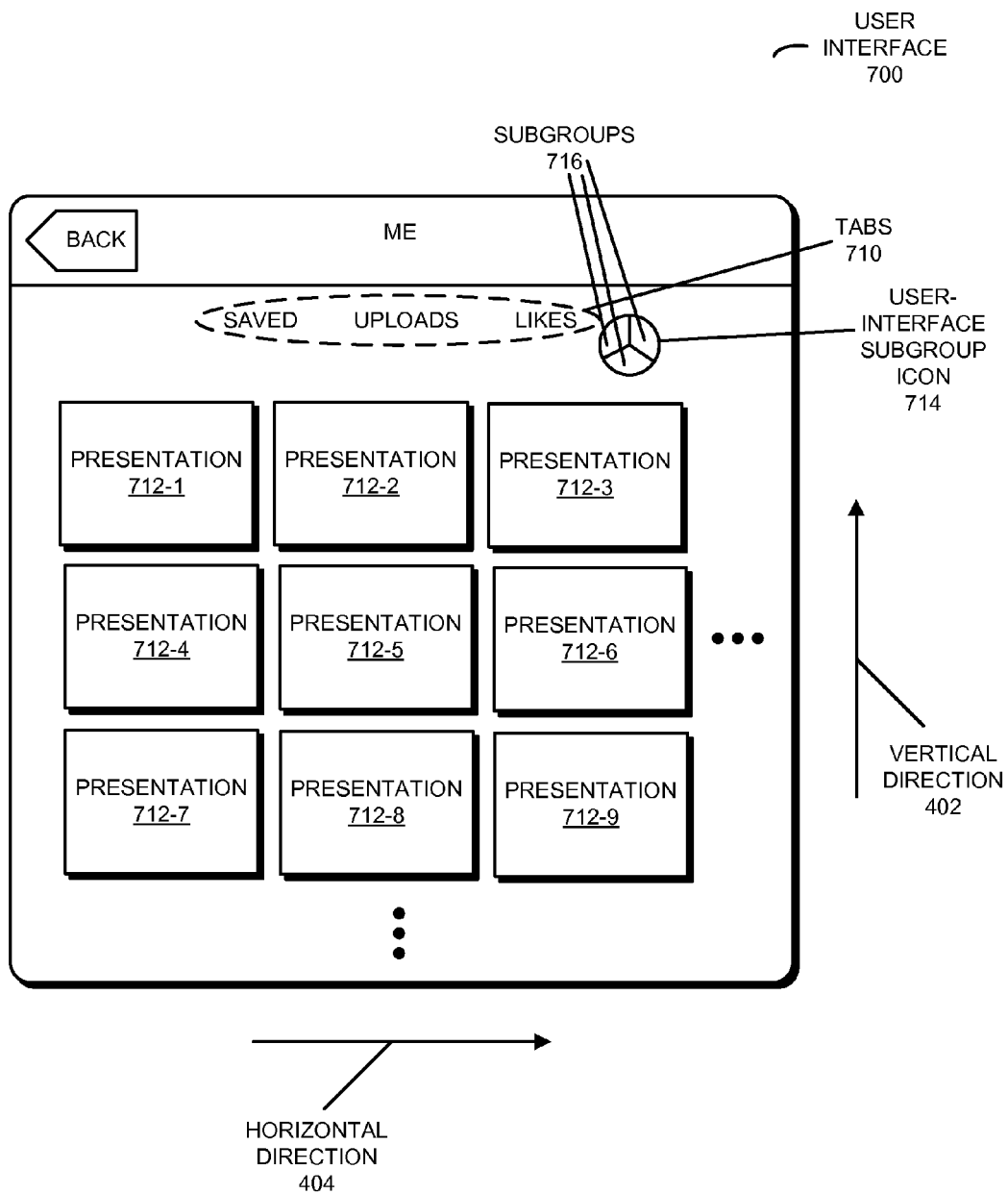
FIG. 7 is a block diagram illustrating a user interface that displays the information associated with the set of presentations in accordance with an embodiment of the present disclosure.

Furthermore, if the user activates the me tab in user interface 400 (FIG. 4), user interface 400 (FIG. 4) may be modified or replaced. This is shown in FIG. 7, which presents a block diagram illustrating a user interface 700 that displays the information associated with the set of presentations. In particular, user interface 700 may include tabs 710 for presentations 712 that are saved, uploads (i.e., that the user previously uploaded) and likes (i.e., that the user has previously indicated that they like).

Note that uploads may be stored in distributed storage system 132 (FIG. 1). In some embodiments, presentations can only be uploaded from a desktop computer of the user. These uploaded presentations may be synchronized by system 100 (FIG. 1) across multiple platforms (including the electronic device). In addition, note that likes may have been communicated as public actions to individuals that follow or subscribe to the user's presentation activities (e.g., in a social network), and records of these likes may be maintained in system 100 (FIG. 1).

As noted previously, saved presentations (such as presentations 712 shown in FIG. 7) may be stored in memory on the electronic device, and may (or may not) only be accessible via the electronic device (e.g., they may not be stored elsewhere in system 100 in FIG. 1). Because these presentations are stored locally, they are available to the user even when the electronic device is not accessing or cannot access network 114 in FIG. 1.

In general, the electronic device may store up to N presentations (such as 70 presentations). Because of finite memory in the electronic device, in some embodiments the electronic device performs memory management based on user presentation activity, presentation activity of the group of individuals and/or presentation activity of individuals outside of the group of individuals. For example, if the user does not view or open a given presentation within a pre-defined time interval (such as a week or a month), the given presentation may be removed from the memory in the electronic device. Alternatively or additionally, if the given presentation is viewed or opened by multiple individuals in the group of individuals and/or by individuals outside of the group of individuals within the time interval, the given presentation may not be removed from the memory in the electronic device. Thus, if no one opens or views the given presentation it may be removed, but if many people open or view it, it may be kept in local memory on the electronic device.

Note that if the user activates one of the saved presentations, several command options may be presented in user interface 700 (not shown in FIG. 7). In particular, the user may be asked if they want to delete the presentation, share it (with one or more other individuals via a text message), or if they want to indicate that they like it.

In some embodiments, user interface 700 graphically provides the user options as to different subgroups of individuals with whom they can share a like of a given presentation. For example, the subgroups may include different groups of friends (such as college friends, members of a sports club, colleagues at a company or organization, members of a professional society, etc.). User interface 700 may include a selectable user-interface subgroup icon 714 (more generally, a control object) that allows the user to select one or more subgroups 716. The selections made using subgroup icon 714 may specify which individuals are informed that the user liked the given presentation.

In addition, these selections may help determine the order of presentations (FIG. 1) in user interface 400 (FIG. 4) by refining the relevant likes to use in the ordering technique. Alternatively or additionally, the likes of individuals and/or subgroups 716 may have predefined weights associated with them, and these weights may be used to determine the order of presentations (FIG. 1) offered or presented in user interface 400 (FIG. 4). Thus, the likes of people similar to the user (such as those that have similar profiles, interests in their profiles, views of presentations, etc.) may have higher weights than other people, so that the people similar to the user have a larger impact when determining the order of presentations (FIG. 1) in user interface 400 (FIG. 4). This approach may improve the relevance of the order of the offered presentations.

Figure 8:
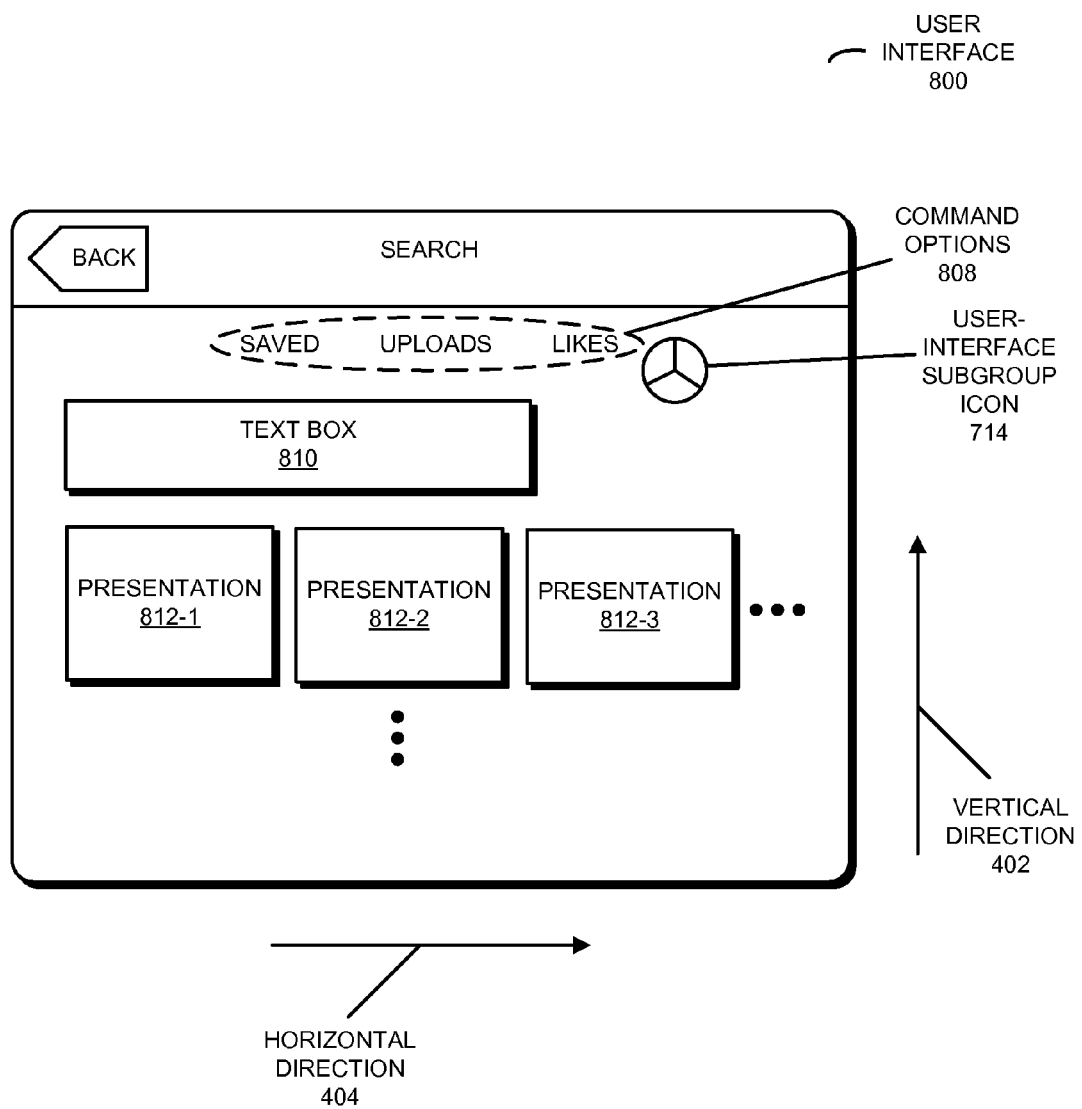
FIG. 8 is a block diagram illustrating a user interface that displays the information associated with the set of presentations in accordance with an embodiment of the present disclosure.

Additionally, if the user activates the search tab in user interface 400 (FIG. 4), user interface 400 (FIG. 4) may be modified or replaced. This is shown in FIG. 8, which presents a block diagram illustrating a user interface 800 that displays the information associated with a set of presentations. User interface 800 may provide command options 808 to the user so the user can conduct searches of presentations that are in system 100 (FIG. 1). In particular, command options 808 include saved, uploads and likes tabs to allow a user to narrow the scope of a search to presentations corresponding to these criteria. As shown in FIG. 8, user interface 800 may include a text box 810 or control object that the user can use to type in a search term or query. In response, presentations 812 that are available in system 100 (FIG. 1) may be displayed.

Figure 9:
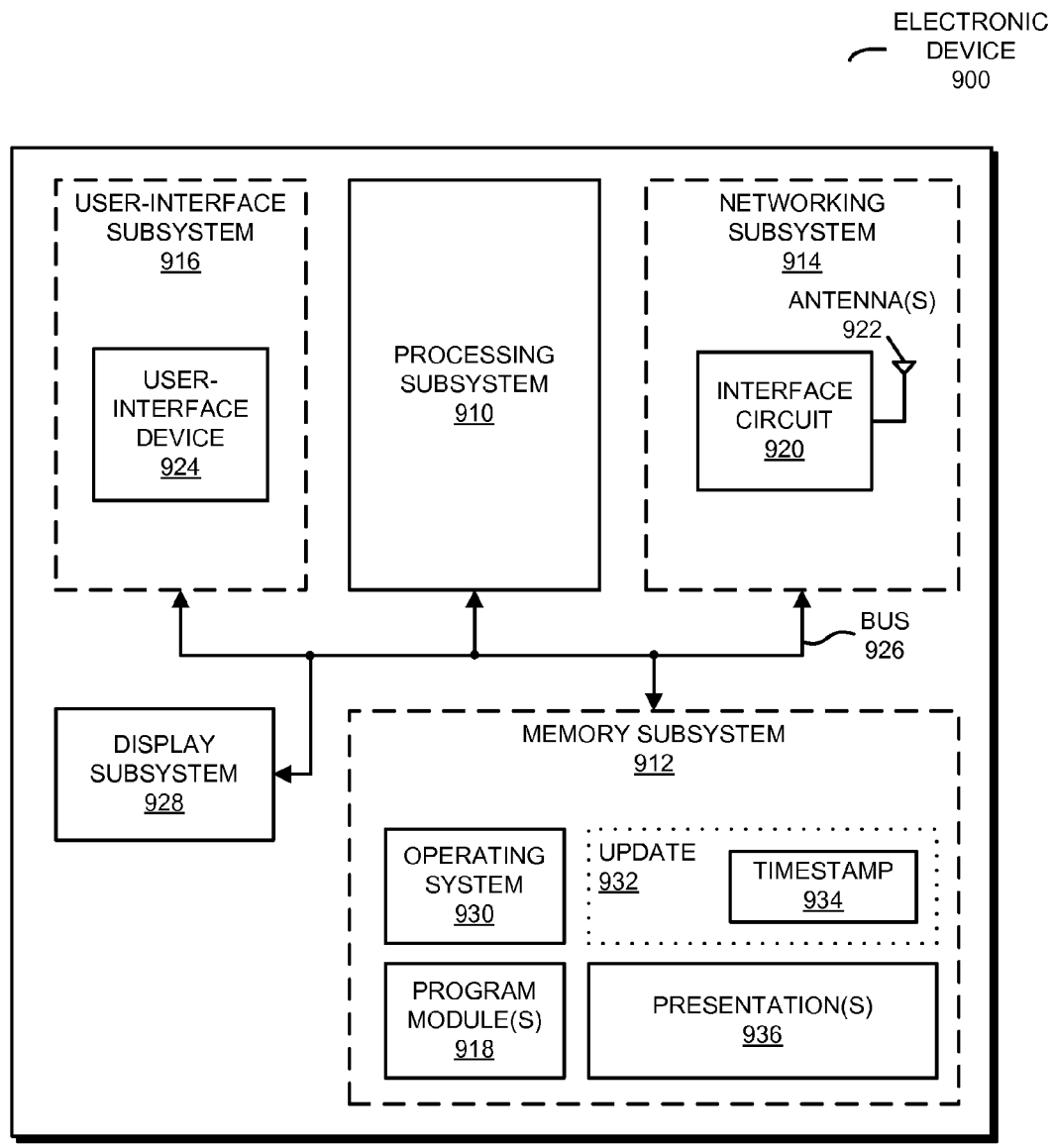
FIG. 9 is a block diagram illustrating an electronic device that performs the method of FIGS. 2 and 3 in accordance with an embodiment of the present disclosure.

We now describe embodiments of the electronic device. FIG. 9 presents a block diagram illustrating electronic device 900. This electronic device includes processing subsystem 910, memory subsystem 912, networking subsystem 914, user-interface subsystem 916, and display subsystem 928. Processing subsystem 910 includes one or more components configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more components for storing data and/or instructions for use by processing subsystem 910, networking subsystem 914, and/or user-interface subsystem 916. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as one or more program modules 918, e.g., a browser or a presentation application), which may be executed by processing subsystem 910. Note that the one or more computer programs may constitute a computer-program mechanism. Moreover, instructions in the various modules in memory subsystem 912 may be implemented in a high-level procedural language, an object-oriented programming language, and/or in an assembly or machine language. Furthermore, the programming language may be compiled or interpreted, e.g., configurable or configured (which may be used interchangeably in this discussion) to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including an interface circuit 920 and one or more antennas 922. For example, networking subsystem 914 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Moreover, networking subsystem 914 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 900 may use the mechanisms in networking subsystem 914 for performing simple wireless communication between electronic device 110 and presentation server 116 (FIG. 1), e.g., transmitting advertising frames and/or near-field communication.

User-interface subsystem 916 may include one or more processors, controllers and devices for receiving the information from a user of electronic device 900 (such as account information and/or one or more user inputs), and for securely communicating this information to processing subsystem 910. For example, the information may include account information (such as a username and a password), which is received using a user-interface device 924 (such as a keypad, a keyboard, a pointer, a mouse, a touch-sensitive display, optical character recognition and/or voice recognition). Alternatively or additionally, the information may include one or more user inputs specifying modifications to a displayed user interface that includes information associated with a set of presentations.

During operation of electronic device 900, the device receives, via networking subsystem 914, instructions for update 932 (such as a set of presentations) associated with a timestamp 934. In response to receiving update 932, one of the one or more program modules 918 (such as a module that is executed by a browser) generates instructions for a user interface, which is displayed on display subsystem 928.

Subsequently, when user-interface subsystem 916 receives one or more user inputs (such as a user command, activation of a physical or virtual icon, performing a gesture using one or more digits on a touch-sensitive display, etc.), the one of the one or more program modules 918 may modify the user interface. For example, the set of presentations may be displaced along the vertical direction of the user interface and/or the thumbnails or tiles associated with a given presentation may be displaced along the horizontal direction of the user interface.

In some embodiments, memory subsystem 912 includes or stores one or more presentations 936, which may be included in update 932.

Within electronic device 900, processing subsystem 910, memory subsystem 912, networking subsystem 914, and user-interface subsystem 916 may be coupled using one or more interconnects, such as bus 926. These interconnects may include an electrical, optical, and/or electro-optical connection that the subsystems can use to communicate commands and data among one another. Note that different embodiments can include a different number or configuration of electrical, optical, and/or electro-optical connections among the subsystems.

In some embodiments, display subsystem 928 may include a display driver for displaying information on a display component, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device. Moreover, networks 114 and/or 118 (FIG. 1) may include the Internet, World Wide Web (WWW), an intranet, a cellular-telephone network, LAN, WAN, MAN, or a combination of networks, or other technology enabling communication between computing systems.

Although specific components are used to describe electronic device 900, in alternative embodiments different components and/or subsystems may be present in electronic device 900. For example, electronic device 900 may include one or more additional processing subsystems, memory subsystems, networking subsystems, and/or user-interface subsystems. Additionally, one or more of the subsystems may not be present in electronic device 900. Moreover, in some embodiments, electronic device 900 may include one or more additional subsystems that are not shown in FIG. 9. For example, electronic device 900 can include a data collection subsystem, an audio and/or video subsystem, an alarm subsystem, a media processing subsystem, and/or some other subsystem not already mentioned. Also, although separate subsystems are shown in FIG. 9, in some embodiments, some or all of a given subsystem or component can be integrated into one or more of the other subsystems or components in electronic device 900. For example, in some embodiments the one or more program modules 918 are included in operating system 930. Alternatively or additionally, user-interface subsystem 916 may be integrated into or with display subsystem 928.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Furthermore, while the preceding discussion focused on the hardware, software and functionality in electronic device 900, presentation server 116 (FIG. 1), account-management server 120 (FIG. 1), links server 124 (FIG. 1) and/or communication server 128 (FIG. 1) may have the same or similar hardware (processors, memory, networking interfaces, etc.) and/or software to support the operations performed by these entities. In particular, these entities may include one or more computer systems with a processing subsystem that executes one or more program modules stored in a memory subsystem to perform the operations, and one or more networking interfaces for communicating with other electronic devices, such as electronic device 900.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for displaying information associated with a set of presentations, the method comprising:
   using the electronic device, generating instructions for a user interface that includes the information associated with the set of presentations, which is arranged in the user interface in different categories along a vertical direction of the user interface, wherein each category comprises a number of presentations of the set of presentations, and wherein:
   the order of the different categories in the vertical direction and the presentations in each category is determined based on presentation preferences of a user of the electronic device and presentation activities of a group of individuals associated with the user, wherein a subgroup of the group of individuals is specified by the user to be informed that the user likes a given presentation, wherein likes from the group of individuals for the presentations are used to determine the order, and wherein the likes from the subgroup of individuals have higher weights than other individuals when determining the order;

thumbnails associated with pages of individual presentations in the set of presentations is arranged along a horizontal direction of the user interface; and
a given presentation in the set of presentations is removed from the electronic device upon determining that the given presentation was not opened by the user within a predefined time interval;
displaying the user interface on a display component in the electronic device;
receiving a user input; and
modifying the displayed user interface in response to the user input, wherein:
if the user input specifies a vertical displacement, the modification includes displacing the set of presentations along the vertical direction; and
if the user input specifies a horizontal displacement, the modification includes displacing the thumbnails for a given individual presentation along the horizontal direction.

2. The method of claim 1, wherein the order of the different categories is dynamically determined based on the presentation activities of the group of individuals.

3. The method of claim 1, wherein a given category includes information associated with one presentation in the set of presentations.

4. The method of claim 1, wherein the presentation activities include at least one of:
presentations shared by at least one individual in the group of individuals;
presentations identified as liked by at least one individual in the group of individuals;
presentations uploaded by at least one individual in the group of individuals;
presentations viewed by at least one of the individuals in the group of individuals;
presentations commented on by at least one individual in the group of individuals; and
trends in the popularity of presentations among the individuals in the group of individuals.

5. The method of claim 1, wherein the presentation preferences include categories followed by the user.

6. The method of claim 1, wherein the group of individuals includes: individuals with whom the user has a professional relationship, friends of the user, friends of friends of the user, and individuals in a social network that includes the user.

7. The method of claim 1, wherein:
the user input includes selection of a given one of the thumbnails in the given presentation; and
in response to the selection, the method further comprises displaying another user interface with information associated with the pages in the given presentation.

8. The method of claim 7, wherein the user input includes a tap on the given one of the thumbnails.

9. The method of claim 1, wherein:
the display includes a touch-sensitive display; and
wherein the user input corresponds to interaction of one or more digits of the user with the touch-sensitive display.

10. The method of claim 1, wherein the set of presentations is stored on the electronic device so that the set of presentations is presented without the electronic device communicating, via a network, with another electronic device that includes the set of presentations.

11. A computer-program product for use in conjunction with an electronic device, the computer-program product comprising a non-transitory computer-readable storage medium and a computer-program mechanism embedded therein, to display information associated with a set of presentations, the computer-program mechanism including:
instructions for generating instructions for a user interface that includes the information associated with the set of presentations, which is arranged in the user interface in different categories along a vertical direction of the user interface, wherein each category comprises a number of presentations of the set of presentations, and wherein:
the order of the different categories in the vertical direction and the presentations in each category is determined based on presentation preferences of a user of the electronic device and presentation activities of a group of individuals associated with the user, wherein a subgroup of the group of individuals is specified by the user to be informed that the user likes a given presentation, wherein likes from the group of individuals for the presentations are used to determine the order, and wherein the likes from the subgroup of individuals have higher weights than other individuals when determining the order;
thumbnails associated with pages of individual presentations in the set of presentations is arranged along a horizontal direction of the user interface; and
a given presentation in the set of presentations is removed from the electronic device upon determining that the given presentation was not opened by the user within a predefined time interval;
instructions for displaying the user interface on a display in the electronic device;
instructions for receiving a user input; and
instructions for modifying the displayed user interface in response to the user input, wherein:
if the user input specifies a vertical displacement, the modification includes displacing the set of presentations along the vertical direction; and
if the user input specifies a horizontal displacement, the modification includes displacing the thumbnails for a given individual presentation along the horizontal direction.

12. The computer-program product of claim 11, wherein the order of the different categories is dynamically determined based on the presentation activities of the group of individuals.

13. The computer-program product of claim 11, wherein a given category includes information associated with one presentation in the set of presentations.

14. The computer-program product of claim 11, wherein the presentation activities include at least one of:
presentations shared by at least one individual in the group of individuals;
presentations identified as liked by at least one individual in the group of individuals;
presentations uploaded by at least one individual in the group of individuals;
presentations viewed by at least one of the individuals in the group of individuals;
presentations commented on by at least one individual in the group of individuals;
and trends in the popularity of presentations among the individuals in the group of individuals.

15. The computer-program product of claim 11, wherein:
the user input includes selection of a given one of the thumbnails in the given presentation; and
the computer-program mechanism further includes instructions for displaying, in response to the selection, another user interface with information associated with the pages in the given presentation.

16. An electronic device, comprising:
a processor;
memory; and
a program module, wherein the program module is stored in the memory and configurable to be executed by the processor to display information associated with a set of presentations, the program module including:
instructions for generating instructions for a user interface that includes the information associated with the set of presentations, which is arranged in the user interface in different categories along a vertical direction of the user interface, wherein each category comprises a number of presentations of the set of presentations, and wherein:
the order of the different categories in the vertical direction and the presentations in each category is determined based on presentation preferences of a user of the electronic device and presentation activities of a group of individuals associated with the user, wherein a subgroup of the group of individuals is specified by the user to be informed that the user likes a given presentation, wherein likes from the group of individuals for the presentations are used to determine the order, and wherein the likes from the subgroup of individuals have higher weights than other individuals when determining the order;
thumbnails associated with pages of individual presentations in the set of presentations is arranged along a horizontal direction of the user interface; and
a given presentation in the set of presentations is removed from the electronic device upon determining that the given presentation was not opened by the user within a predefined time interval;
instructions for displaying the user interface on a display in the electronic device;
instructions for receiving a user input; and
instructions for modifying the displayed user interface in response to the user input, wherein
if the user input specifies a vertical displacement, the modification includes displacing the set of presentations along the vertical direction; and
if the user input specifies a horizontal displacement, the modification includes displacing the thumbnails for a given individual presentation along the horizontal direction.

17. The electronic device of claim 16, wherein the order of the different categories is dynamically determined based on the presentation activities of the group of individuals.

18. The electronic device of claim 16, wherein a given category includes information associated with one presentation in the set of presentations.

19. The electronic device of claim 16, wherein the presentation activities include at least one of:
presentations shared by at least one individual in the group of individuals;
presentations identified as liked by at least one individual in the group of individuals;
presentations uploaded by at least one individual in the group of individuals;
presentations viewed by at least one of the individuals in the group of individuals;
presentations commented on by at least one individual in the group of individuals; and
trends in the popularity of presentations among the individuals in the group of individuals.

20. The electronic device of claim 16, wherein:
the user input includes selection of a given one of the thumbnails in the given presentation; and
the program module further includes instructions for displaying, in response to the selection, another user interface with information associated with the pages in the given presentation.

* * * * *